Jan. 9, 1962 R. L. MOTLEY 3,015,909
BABY RATTLER WITH SLIDING RATTLES
Filed April 2, 1959 2 Sheets-Sheet 1

Robert L. Motley
INVENTOR.

Jan. 9, 1962 R. L. MOTLEY 3,015,909
BABY RATTLER WITH SLIDING RATTLES
Filed April 2, 1959 2 Sheets-Sheet 2
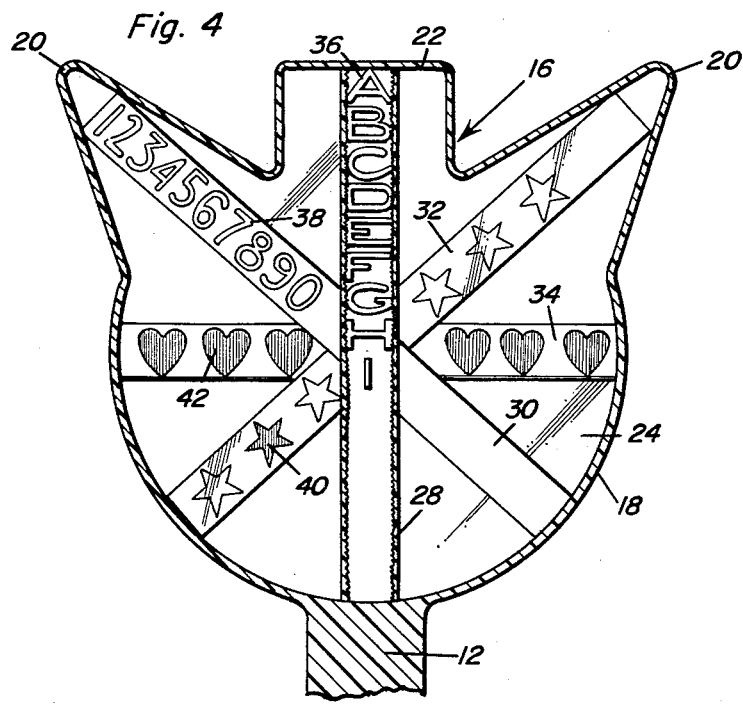
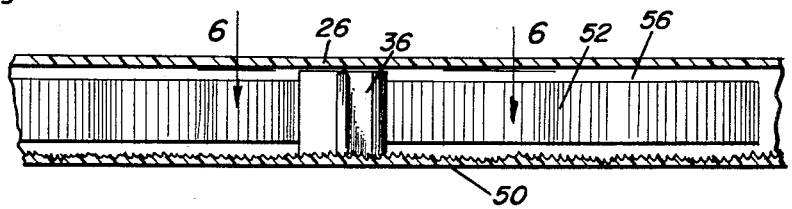
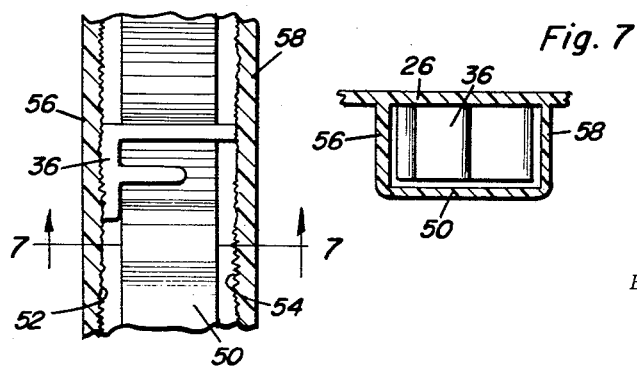
Robert L. Motley
INVENTOR.

United States Patent Office 3,015,909
Patented Jan. 9, 1962

3,015,909
BABY RATTLER WITH SLIDING RATTLES
Robert L. Motley, 607 Burwood Ave., Dayton, Ohio
Filed Apr. 2, 1959, Ser. No. 803,716
6 Claims. (Cl. 46—193)

The present invention generally relates to a rattler for infants and very small children which not only is amusing and entertaining but also is educational and provided with sound producing features for further amusement and entertainment for the child using the device and also for further teaching him difference in sounds and associating them with elements and conditions.

The primary object of the present invention is to provide a baby rattler which may also be used as a teething aid and which incorporates sliding rattlers or sliding elements in the shape of letters, numbers and other known and intriguing shapes so that the child will be acquainted with the numbers, letters of the alphabet and other similar shapes.

A further object of the present invention is to provide a baby rattler in accordance with the preceding object in which the sliding elements are separated categorically in different trackways or guideways which intersect and are disposed in different vertical planes so that, in effect, the sliding elements pass over and under each other.

Another very important feature of the present invention is to provide a rattler in accordance with the preceding objects in which the trackways and sliding elements are provided with interengaging serrations or ridges and grooves whereby sliding movement of the sliding elements will produce a sound with the orientation and other physical properties of the notches or serrations being such that different sounds will be produced for different sliding elements so that a child may associate the sounds with the slidable elements thereby furthering the education of the child while at the same time providing a highly amusing and entertaining ratttler.

A still further object of the present invention is to provide a baby rattler which is extremely simple in construction, attractive in appearance, safe, highly amusing and entertaining, educational, sound producing and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a front elevation of the head of the baby rattler with the front wall thereof removed;

FIGURE 5 is a transverse sectional view of the uppermost trackway illustrating the construction thereof and relationship between the trackway and the slidable elements therein;

FIGURE 6 is a sectional view taken substantially upon a plane passing along section line 6—6 of FIGURE 5 illustrating further structural details of the trackway; and FIGURE 7 is a transverse, sectional view taken substantially upon a plane taken along section line 7—7 of FIGURE 6 illustrating further structural details of the trackway.

Figure 1:
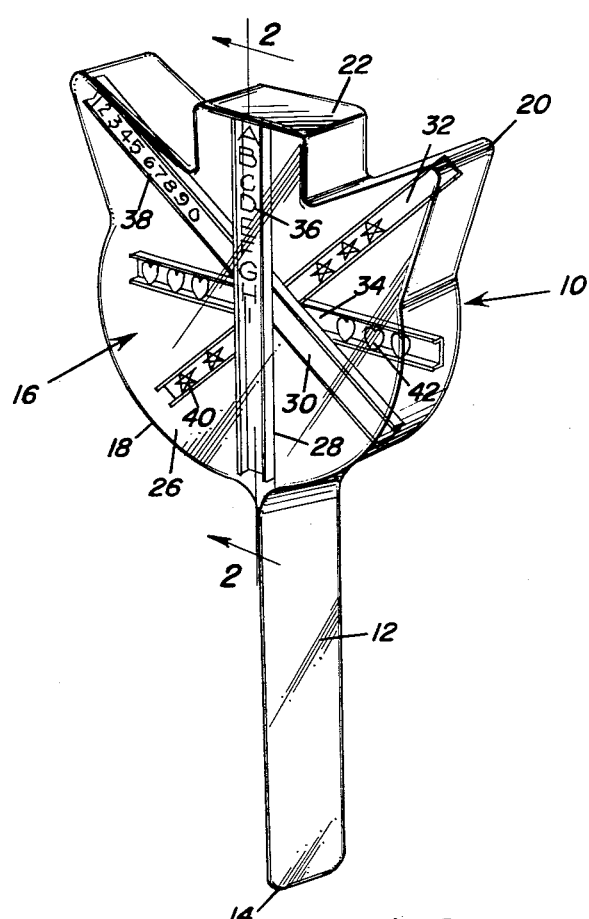
FIGURE 1 is a perspective view of the baby rattler of the present invention.

Referring now specifically to the drawings, the numeral 10 generally designates the rattler of the present invention which includes an elongated shank or handle 12 of solid plastic construction which forms a handle for the rattler and also may be used as a teething aid with the plastic material rendering the same sanitary and strong with the corners thereof being rounded as indicated by the numeral 14 thereby eliminating any sharp projections.

The rattler 10 includes a head portion which is hollow and generally designated by the numeral 16 which may be generally in the shape of a transverse cross-section of a cat's head or in the form of a shield in that it is provided with a generally rounded portion 18 and projections 20 which may simulate ears and also a central upstanding or upwardly extending projecting area 22 with the hollow head 16 being integral with and molded as one-piece with the handle or shank 12. The head 16 is also provided with a rear wall 24 and a front wall 26 which also is of one-piece construction with the shank 12.

Figure 2:
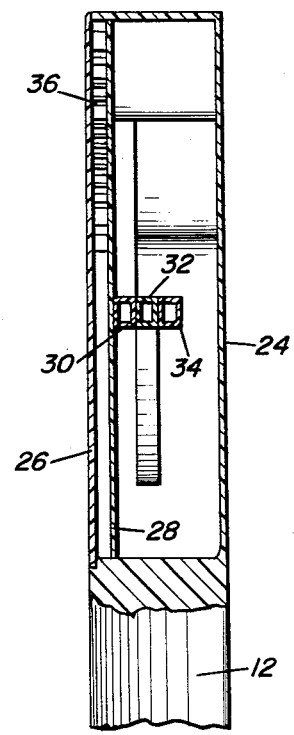
FIGURE 2 is a vertical sectional view taken substantially upon a plane passing along section line 2—2 of FIGURE 1 illustrating the orientation of the tracks or guideways within the hollow head of the rattler.
Figure 3:
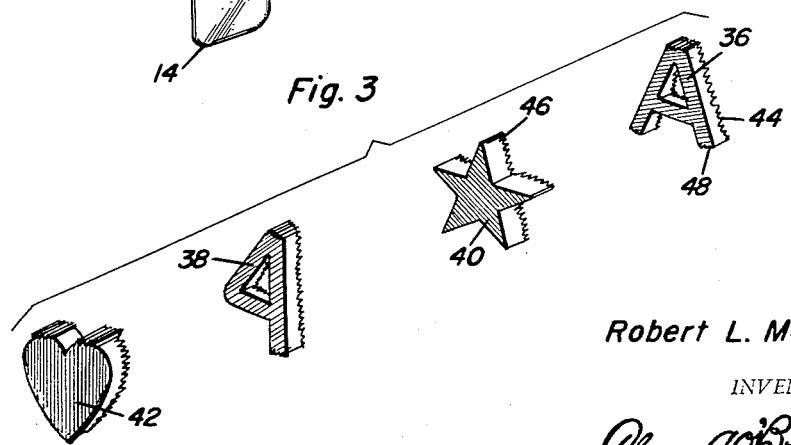
FIGURE 3 is an exploded group perspective view illustrating exemplary sliding elements disposed in the individual trackways.

Disposed in underlying relation to the front plate 26 is a plurality of diagonally extending and intersecting hollow trackways designated by the numerals 28, 30, 32 and 34 (see FIGURE 2). The forwardmost trackway 28 extends vertically and the next two trackways 30 and 32 extend diagonally and the rearmost trackway 34 extends transversely. Each of the trackways is in the form of a hollow tubular member and the trackway 28 has the front wall thereof formed by the wall 26 of the head 16. Slidable elements are disposed in each trackway and the trackway 28 is provided with letters of the alphabet designated by the numeral 36 and which are arranged in alphabetical arrangement. Trackway 30 is provided with the unit numbers 38 from 1 through zero. The trackway 32 is provided with a plurality of stars 40 while the trackway 34 is provided with a plurality of hearts 42. The various slidable elements may be colored in any suitable manner and as illustrated in FIGURE 3, the rear surface or undersurface of each of the slidable elements is provided with serrations designated by the numeral 44 while the top edge thereof is provided with serrations or grooves 46 and the lower edge thereof is also provided with groovings 48. The grooving is arranged on opposite edges of the various sliding elements in any way desirable so that the grooving 44 will engage grooving or ridges 50 on the bottom wall of the trackways while the grooving 46 and 48 will engage grooving or ridges 52 and 54 respectively on the side walls 56 and 58 of the trackways. In the example illustrated in FIGURES 5-7, the letter F is employed and simultaneously engages the grooves or ridges 50, 52 and 54 with the corresponding groovings and ridges 44, 46 and 48 whereby sliding movement of the letter F will cause a sound to be produced due to the difference in the depth and closeness of the various grooves whereby the sliding movement of the letter F will cause the sound to be produced dependent upon the relationship between the grooves and ridges. The same is true for the numbers and the figures such as the stars and the hearts.

FIGURE 2 also illustrates the orientation of the trackways whereby the movable elements in one appear to pass over the movable elements in the other without interference therefrom.

The trackways with the sound producing grooves therein may be varied by providing a crossed grooving effect, longitudinal grooves, depressed circular or half circular, square or half square areas so as to produce different sounds in the plastic material. By sliding the slidable members across the different molded shapes, different sounds would be made and such sounds could actually be the sound of a letter or a word thus helping to educate the child as to the sound of the letters, numbers or the like and also making him acquainted with simple words.

The present device may be constructed of plastic material either completely transparent or at least partially so and the movable elements also would be of plastic material which may be colored various colors and the rattler will effectively teach the child the letters of the alphabet and acquaint them with the numbers and also acquaint them with various sounds. It is also noted that the trackways are provided with longitudinal edge grooves outwardly of the sound producing grooves which may receive projections on the slidable elements so that the slidable elements will be maintained in proper orientation in relation to the trackways and the sound grooving for effective utilization thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rattler for infants comprising a hollow head including a front plate, a depending integral shank connected to said head and forming a handle for the head, a plurality of trackways disposed within said head, and a plurality of sliding elements carried by each trackway for movement thereon whereby the elements will move in relation to each other, each of said trackways being tubular and provided with a plurality of grooves and ridges defined in the major portion of the inner surface thereof, each of said sliding elements having grooved areas thereon for sliding engagement with the grooves in the trackway for producing a sound, said grooves and ridges on the trackway being arranged transversely of the trackway, the grooves on the sliding elements paralleling the grooves and ridges on the trackway.

2. The structure as defined in claim 1 wherein said grooves and ridges have different depths and spacings for producing different sounds.

3. The structure as defined in claim 1 wherein said sliding elements include a group of alphabetically arranged letters, a group of numerically arranged numbers and groups of known objects, said head and trackways being transparent thereby enabling observation of the movement of said sliding elements.

4. The structure defined in claim 3 wherein said shank is constructed of solid plastic material thus forming a teething device for a child.

5. The structure as defined in claim 3 wherein said trackways are disposed in intersecting relation, one of said trackways having the front wall of the head forming the front wall of the trackway.

6. The structure as defined in claim 5 wherein said head and trackways are transparent and said sliding elements are distinguishably colored for permitting observation of the colors and the sliding elements and also permitting comparison of the sounds produced by the sliding elements with the sliding elements.

References Cited in the file of this patent

UNITED STATES PATENTS

| | | |
|---|---|---|
| 2,352,676 | Gainsley | July 4, 1944 |
| 2,514,844 | Cohen | July 11, 1950 |
| 2,521,331 | Biggs | Sept. 5, 1950 |
| 2,546,680 | Samuels | Mar. 27, 1951 |
| 2,788,612 | Sametz | Apr. 16, 1957 |

FOREIGN PATENTS

| | | |
|---|---|---|
| 58,036 | Netherlands | Aug. 15, 1946 |